United States Patent Office 3,577,468
Patented May 4, 1971

3,577,468
MONOHALOGENATION OF ALKYL-
ADAMANTANE HYDROCARBONS
Abraham Schneider, Overbrook Hills, Pa., assignor to
Sun Oil Company, Philadelphia, Pa.
No Drawing. Filed Mar. 26, 1968, Ser. No. 715,958
Int. Cl. C07c 17/10
U.S. Cl. 260—648                                        18 Claims

ABSTRACT OF THE DISCLOSURE $C_{11}$–$C_{20}$ alkyladamantane hydrocarbons are monochlorinated, monobrominated or monofluorinated at an unsubstituted bridgehead position by reacting the same at −30° C. to 10° C. with a $C_4$–$C_5$ tertiary alkyl chloride, bromide or fluoride, using as catalyst 90–100% sulfuric acid or 90–100% hydrofluoric acid. The corresponding 1-haloalkyladamantane is obtained with little if any other reaction products.

CROSS REFERENCES TO RELATED APPLICATIONS

My application Ser. No. 649,810, filed June 29, 1967, now abandoned, describes reactions of adamantane hydrocarbons wherein, in certain embodiments, the reactant materials can be the same as are used in the present invention. However, in the process of said application a different type of catalyst ($AlCl_3$ or $AlBr_3$) is used and the reaction is carried out under conditions such that bis-type or polymer products are formed wherein adamantane nuclei are linked to each other between bridgehead positions through tetramethylene linkages. Reactions according to the present invention are effected under different conditions that result, instead, in the formation of monohalogenated adamantane derivatives.

My application Ser. No. 702,789, filed Feb. 5, 1968, now Pat. No. 3,485,880, describes other reactions of adamantane hydrocarbons wherein the reactants can be the same as in the present invention. The last-mentioned application likewise utilizes a different catalyst ($AlCl_3$ or $AlBr_3$) in combination with homogeneous reaction conditions that produce, as the main reaction products, polyhalogenated admantane derivatives instead of monohaloadamantanes.

BACKGROUND OF THE INVENTION

This invention relates to a method of converting $C_{11}$–$C_{20}$ adamantane hydrocarbons into bridgehead monohalogenated derivatives. More particularly the invention is concerned with monochlorination, monobromination or monofluorination of $C_{11}$–$C_{20}$ alkyladamantanes having at least one unsubstituted bridgehead carbon atom.

The adamantane nucleus has ten carbon atoms, four of which are bridgehead carbons that are equivalent to each other, as can be seen from the following typographical representation:

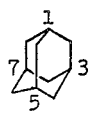

As shown, the bridgehead carbon atoms customarily are designated by the numerals 1, 3, 5 and 7 respectively.

In the prior art adamantane itself has been halogenated by reaction with free chlorine or bromine, as disclosed in the following references: Smith and Williams, J. Org. Chem., 26, 2207 (1961); Stetter and Wulff, Chem. Ber., 93, 1366 (1960); Stetter, Angew. Chem., internat. edit., vol. 1, (1962), No. 6, 287–288; and German Pat. No. 1,101,410. In the presence of an aluminum trihalide catalyst substitution of the halogen only at bridgehead positions occurred.

The foregoing procedures also can be used to halogenate alkyl-substituted adamantanes and yield bridgehead halogenated derivatives. However, with alkyl substituents in the starting adamantane hydrocarbon, there is a tendency for halogenation to occur in the alkyl groups as well as on the nucleus, especially when the halogen is chlorine. Thus mixtures of halogenated products in which the chlorine appears both in the substituent groups and on the nucleus are obtained. Halogenation by means of free chlorine consequently is not particularly satisfactory when the starting material is an alkyladamantane and only a bridgehead monohalogenated product is desired.

Also in the prior art, Gerzon et al., J. Med. Chem., 6, 760–763 (1963), and Gerzon U.S. Pat. No. 3,096,372 disclose the reaction of adamantane, dissolved in cyclohexane, with t-butyl chloride utilizing $AlCl_3$ as the catalyst. The $AlCl_3$ was shown to be capable of causing a hydrogen-chlorine interchange between the adamantane and the t-butyl chloride, yielding 1-chloroadamantane as product. Reaction in this manner is not particularly suitable, however, for making a bridgehead monochloro product if the starting hydrocarbon is an alkyladamantane having a $C_2$ or higher alkyl group. When such alkyladamantanes are substituted for admantane in this reaction, the $AlCl_3$ catalyst tends to cause other reactions in addition to bridgehead halogenation, including side chain halogenation, isomerization of $C_2$ or higher alkyl groups and disproportionation of $C_3$ or higher alkyl groups.

SUMMARY OF THE INVENTION

The present invention provides a facile means of converting a $C_{11}$–$C_{20}$ alkyladamantane having at least one unsubstituted bridgehead position into a bridgehead monochloro, monobromo or monofluoro derivative. The procedure involves a hydrogen-halogen interchange reaction between an unsubstituted bridgehead position on the adamantane nucleus and a $C_4$–$C_5$ tertiary alkyl chloride, bromide or fluoride, the reaction being effected by means of strong sulfuric or hydrofluoric acid which is present as a separate phase. Only a bridgehead position on the nucleus is involved in the reaction, and consequently halogen atoms are not transferred either to nonbridgehead positions on the nucleus or into alkyl substituents of the alkyladamantane feed. Also, when the starting hydrocarbon has more than one unsubstituted bridgehead position, only one of these becomes involved in the reaction to a substantial extent so that little if any polyhalogenated product is obtained.

The process of the invention comprises the following steps:

(a) establishing a two-phase admixture of
  (1) a $C_{11}$–$C_{20}$ alkyladamantane having at least one unsubstituted bridgehead carbon atom and no alkyl tertiary carbon atom,
  (2) a tertiary $C_4$–$C_5$ alkyl halide which is a chloride, bromide or fluoride,
  (3) and as a second phase a mineral acid selected from the group consisting of 90–100% sulfuric acid or 90–100% hydrofluoric acid;
(b) reacting the mixture by contacting the phases at a temperature in the range of −30° C. to 10° C., whereby a halogen-hydrogen interchange between the tertiary alkyl halide and a bridgehead position of said adamantane hydrocarbon occurs;
(c) and separating from the reaction mixture a 1-halo derivative of said alkyladamantane as the main reaction product.

DESCRIPTION OF THE INVENTION

As a specific illustration of the process, 10 parts (by weight) of 1,3-dimethyladamantane are dissolved in 15 parts of tertiary butyl bromide, the solution is cooled to −5° C. and contacted at that temperature with 100 parts of 96% $H_2SO_4$ present as a separate phase. The mixture is stirred at −5° C. for two hours, during which time isobutane is formed and partly evolves. The reaction which takes place can be represented by the following equation (hydrogen atoms being omitted):

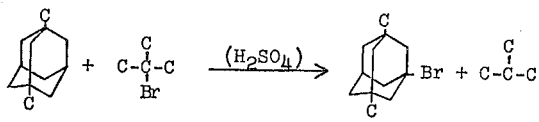

As indicated by the equation, a bridgehead hydrogen atom and the bromine atom exchange places so that the desired 1-bromoalkyladamantane is readily formed along with isobutane. The 1-bromo-3,5-dimethyladamantane product can be recovered by separating the product phase from the acid phase and washing it with water to remove any residual acid, and then distilling any excess tertiary butyl bromide from the product.

The reaction shown in the equation occurs largely to the exclusion of any other reaction. Even in cases where a large molar excess of the t-butyl halide over the one-to-one stoichiometric ratio is employed, reaction at the second bridgehead position to give a dihalo product does not take place to any substantial extent. The reaction is believed to occur in the acid phase and evidently depends on some degree of solubility of each reactant therein. Thus, during the reaction, a continuous transfer of reactants into the acid phase and the reverse transfer of reaction product from the acid phase occur. Good agitation of the mixture accordingly is desirable to expedite the reaction.

The halogenating agent for practicing the invention must be a $C_4$ or $C_5$ tertiary alkyl chloride, bromide or fluoride or, in other words, t-butyl or t-amyl chloride, bromide or fluoride. Primary or secondary halides are not suitable, for these are largely inert under the reaction conditions of the present process. Also it is essential that a low reaction temperature, i.e., in the range of −30° C. to 10° C., be used. Higher temperatures will result in the formation of substantial amounts of alkylation products in which the adamantane nucleus has become attached to alkyl and/or haloalkyl groups derived from the $C_4$–$C_5$ tertiary alkyl halide reactant. Preferably a reaction temperature in the range of −10° C. to 5° C. is employed.

The proportion of halogenating agent to the alkyladamantane is not critical and the 1-halo derivative is formed as the main reaction product regardless of the proportion used. The stoichiometric molar proportion for conversion of all the alkyladamantane feed is 1:1 as indicated by the equation presented above. However, it is usually desirable to employ a substantial excess of the $C_4$–$C_5$ tertiary alkyl halide so that the excess will serve as a solvent both for the feed hydrocarbon and for the halogenated product. In instances where the starting hydrocarbon would normally be a solid at the temperature to be used in the reaction, as in the case of such hydrocarbons as 1-methyladamantane, 2-methyladamantane, 1-n-butyladamantane, 1-n-decyladamantane and the like, an excess of the halogenating agent is needed to function as a solvent for the hydrocarbon feed. Any excess amount as required for effecting solution of the feed and/or products can be employed. After the reaction has been completed, the excess can be recovered and recycled.

When a tertiary $C_4$ or $C_5$ alkyl chloride or bromide is used to form a 1-chloro or 1-bromo alkyladamantane derivative as the desired product, it is preferable to use sulfuric acid rather than hydrofluoric acid as the catalyst. This avoids the possibility of halogen-halogen interchange that otherwise might occur between the HF and the alkyl chloride or bromide or the chloro or bromo reaction product. Such interchange could result in mixed monohalo derivatives of the alkyladamantane which ordinarily would not be desired as the product. On the other hand, when the reactant is a $C_4$ or $C_5$ tertiary alkyl fluoride, halogen-halogen interchange is not a factor and either HF or $H_2SO_4$ can advantageously be employed.

As previously stated, the strength of the acid should be in the range of, by weight, 90–100% $H_2SO_4$ or 90–100% HF. Preferably sulfuric acid with a strength of 95–99% $H_2SO_4$ is used. When hydrofluoric acid is employed, a strength in the range of 94–100% HF is preferred. Strength as here used is calculated on an organic matter-free basis and relates to the proportion of $H_2SO_4$ or HF to water present. Generally a volume excess of the acid relative to the adamantane hydrocarbon should be used and a volume ratio thereof in the range of 1:1 to 20:1 typically is employed.

The starting hydrocarbon can be any $C_{11}$–$C_{20}$ alkyladamantane that has at least one unsubstituted bridgehead position in the nucleus. The alkyladamantane can include one, two or more alkyl substituents which can be located at bridgehead and/or nonbridgehead positions provided that at least one bridgehead carbon atom is unsubstituted. Alkyladamantanes as here specified are known and methods of preparing them have been described, for example in the following: U.S. Pat. 3,128,316; U.S. Pat. 3,275,700; U.S. Pat. 3,336,405; U.S. Pat. 3,336,406; U.S. Pat. 3,356,751; Schneider U.S. application Ser. No. 613,443, filed Feb. 2, 1967, now Pat. No. 3,382,288; Spengler et al., Erdöl und Kohle-Erdgass-Petrochemie, 15, 702–707 (1962); and Hoek et al., 85, (1966) Recueil 1045–1053.

The preferred starting hydrocarbons for the present process are the lower alkyladamantanes in which the alkyl groups are methyl and/or ethyl and the total alkyl carbon atoms are from one to four. These lower alkyladamantanes comprise methyladamantanes; dimethyladamantanes; trimethyladamantanes; ethyladamantanes; methylethyladamantanes and dimethylethyladamantanes. Some specific examples of these are as follows: 1-methyladamantane; 2-methyladamantane; 1,2-, 1,3- and 1,4-dimethyladamantane; 1- and 2-ethyladamantanes; 1-ethyl-3-methyladamantane; 1-ethyl-4-methyladamantane; 1,2,4-, 1,2,5-, 1,3,4-, 1,3,5- and 1,3,6-trimethyladamantanes; 1-ethyl - 2,4 - dimethyladamantane; 1-ethyl-3,5-dimethyladamantane; and 1-ethyl-3,6-dimethyladamantane. Illustrative examples of other starting hydrocarbons containing higher alkyl groups are: 1- and 2-butyladamantanes; 1-methyl-3-propyladamantane; 1,3-diisobutyladamantane; 1-ethyl-2-methyl-5-amyladamantane; n-hexyladamantane; n-decyladamantanes; and the like.

A preferred way of carrying out the invention utilizing an excess of tertiary alkyl halide as solvent is given in the following description using 1,3-dimethyladamantane (herein "DMA") as the hydrocarbon, 1-butyl chloride as the tertiary halide and sulfuric acid as catalyst. The DMA is dissolved in the t-butyl chloride, using, for example, between 2 and 10 moles of t-butyl chloride per mole of DMA, and the mixture is cooled to 0° C. in a reactor provided with cooling and agitating means. Sulfuric acid (96% $H_2SO_4$) is introduced in amount between 4 and 6 volumes per volume of DMA while the mixture is being agitated and maintained at 0° C. Agitation at this temperature level is continued until all or most of the DMA has reacted. Times of reaction generally are in the range of 0.5–5 hours. When the reaction has been completed, the mixture is allowed to stratify and the sulfuric acid phase is drawn off. The product phase is washed with water to remove any residual acid and then is distilled to recover the excess t-butyl chloride. Any unreacted alkyladamantane can be separated from the reaction product by distillation. The resulting product is 1-chloro-3,5-DMA typically in a purity greater than 95%.

When the starting alkyladamantane has two or more unsubstituted bridgehead positions, the product generally also contains a small amount (e.g., 1–3%) of polyhalo derivatives most of which is bridgehead dihaloalkyladamantane. If desired, the monohalo product can be separated from these more highly halogenated derivatives by distillation or by fractional crystallization. On the other hand, when the starting hydrocarbon has alkyl groups at three bridgehead positions, as in the case of 1,3,5-trimethyladamantane or 1-ethyl-3,5-dimethyladamantane, essentially no reaction whatever other than monochlorination at the open bridgehead position occurs under the conditions of the present process.

The following examples are specific illustrations of the invention:

EXAMPLE I

This example illustrates the reaction of 1-ethyladamantane (herein "EA") with t-butyl chloride with the objective of producing 1-chloro-EA in high yield. A solution of 1.50 g. (0.0091 mole) of EA and 2.68 g. (0.0289 mole) of t-butyl chloride was shaken in a rocker bomb at 0° C. with 10 ml. of 96% $H_2SO_4$. The molar ratio of t-butyl chloride to EA was 3.2 and the proportion of acid to EA was 6.7 cc./g. Agitation of the mixture at 0° C. was continued for a total time of 80 minutes. The product layer was then separated from the acid layer, washed successively with water and aqueous sodium carbonate, dried over potassium carbonate and then analyzed by VPC. Results are shown in Table I and are given in weight percent on a t-butyl chloride-free basis.

TABLE I

| | |
|---|---|
| Total reaction time, min. | 80 |
| Product composition, wt. percent: | |
| EA | Trace |
| 1-chloro-EA | 98.2 |
| 1,3-dichloro-EA | 1.4 |
| 1,3,5-tetrachloro-EA | 0.4 |

This reaction product after removal of the excess t-butyl chloride was mainly crystalline at room temperature (ca. 75° F.).

The results in Table I show that the process of the present invention is capable of yielding the bridgehead monochloro derivative of the starting hydrocarbon in remarkably high purity. They also shown that substantially the only other products obtained are the bridgehead polychlorinated derivatives.

EXAMPLE II

In this example the same reactants, catalyst and procedure were used as in the preceding example but the proportion of catalyst to EA was substantially lower. Specifically, 2.73 g. (0.0166 mole) of EA, 4.53 g. (0.0493 mole) of t-butyl chloride and 10 ml. of 96% $H_2SO_4$ were shaken at 0° C. for a total time of 297 minutes. The ratio of sulfuric acid to EA here was 3.7 cc./g., as compared to 6.7 cc./g. in Example I. Results are shown in Table II.

TABLE II

| | |
|---|---|
| Total reaction time, min. | 297 |
| Product Composition, wt. percent: | |
| EA | 6.6 |
| 1-chloro-EA | 92.3 |
| 1,3-dichloro-EA | 0.9 |
| 1,3,5-trichloro-EA | 0.2 |

Comparison of these results with those in Table I shows that use of the lower ratio of acid to EA decreased the rate of halogenation but otherwise gave essentially the same results.

Examples II and III show that the only kind of reaction that takes place under conditions of the present process is bridgehead halogenation and that neither nonbridgehead halognation nor side chain halogenation occurs. Also the ethyl group in the presence of the mineral acid catalyst does not undergo isomerization or disproportionation. Such side reactions likewise are essentially absent when the starting hydrocarbon has a $C_3$ or higher alkyl group, which is in contrast to results that would be obtained using $AlCl_3$ under prior art conditions as described in Gerzon U.S. Pat. No. 3,096,372, cited above.

EXAMPLE III

Another run was made in almost the same way as Example I except that 1,3-dimethyladamantane (herein "DMA") was substituted for EA. The molar ratio of t-butyl chloride to DMA was 3.15, the ratio of 96% $H_2SO_4$ to DMA was 6.6 cc./g. and the reaction temperature was 0° C. Two samples of the organic phase were taken at total reaction times, respectively, of 30 and 120 minutes. Each sample was analyzed, with results as shown in Table III.

TABLE III

| Total reaction time, minutes | 30 | 120 |
|---|---|---|
| Product composition, wt. percent: | | |
| DMA | 61.9 | 17.4 |
| 1-chloro-DMA | 38.1 | 82.6 |
| 1,3-dichloro-DMA | Trace | Trace |

Comparison of Tables I and III indicates that the presence of two alkyl groups on the adamantane nucleus (DMA) tends to cause a slower halogenation rate than when only one alkyl group is attached (EA). However, the monohalogenation of DMA, while slower, proceeded nicely with hardly any other product being formed.

Analogous results are obtained when other adamantane hydrocarbons as herein specified are substituted for the starting adamantane compounds used in the foregoing examples. Likewise essentially equivalent results are obtained when tertiary butyl bromide or fluoride is used in place of the tertary chloride. The monohalogenation reaction also proceeds in substantially the same manner when tertiary amyl chlorides, bromides or fluorides are used, but in such cases more side reactions tend to occur. Also, the reaction proceeds in the same fashion when hydrofluoric acid is substituted for sulfuric acid except that, as previously explained, interchange of halogen between the HF and a chlorine- or bromine-containing component of the reaction mixture can occur if different kinds of halogen are present in the mixture.

The monohalogenation products prepared in accordance with the present invention are useful as intermediates for producing adamantane derivatives having a functional group other than halogen attached to the bridgehead position. For example, the 1-haloalkyladamantanes prepared by the present process can be hydrolyzed to the corresponding monools which are useful for preparing special ester-type lubricants as described in Duling and Schneider U.S. Ser. No. 531,059, filed Mar. 2, 1966, now Pat. No. 3,398,165. Such hydrolysis can readily be effected by refluxing the 1-haloalkyladamantane with aqueous caustic soda (e.g., 10% NaOH), whereby an —OH radical is substituted for the halo group at the bridgehead position. The 1-haloalkyladamantanes also can be converted by a Williamson synthesis to methoxyalkyladamantanes which exhibit antiviral activities as described in Moore U.S. application Ser. No. 633,385, filed Apr. 25, 1967, now Pat. No. 3,383,423.

What is claimed is:

1. Process for monohalogenating alkyladamantane hydrocarbons to substitute chlorine, bromine or fluorine at a bridgehead position which comprises:
   (a) establishing a two-phase admixture of
      (1) a $C_{11}$–$C_{20}$ alkyladamantane having at least one unsubstituted bridgehead carbon atom and no alkyl tertiary carbon atoms,
      (2) a tertiary $C_4$–$C_5$ alkyl halide which is a chloride, bromide or fluoride,
      (3) and as a second phase a mineral acid selected from the group consisting of 90–100% sulfuric acid and 90–100% hydrofluoric acid;

(b) reacting the mixture at a temperature in the range of −30° C. to 10° C., whereby a halogen-hydrogen interchange between the tertiary alkyl halide and a bridgehead position of said adamantane hydrocarbon occurs;

(c) and separating from the reaction mixture a 1-halo derivative of said alkyladamantane as the main reaction product.

2. Process according to claim 1 wherein said halide is tertiary butyl chloride.

3. Process according to claim 2 wherein said acid is sulfuric acid.

4. Process according to claim 3 wherein the strength of the sulfuric acid is 95–99% $H_2SO_4$.

5. Process according to claim 3 wherein the starting adamantane hydrocarbon is selected from the group consisting of methyladamantanes, dimethyladamantanes, ethyladamantanes, methylethyladamantanes, dimethylethyladamantanes and trimethyladamantanes.

6. Process according to claim 5 wherein said temperature is in the range of −10° C. to 5° C. and the strength of the sulfuric acid is 95–99% $H_2SO_4$.

7. Process according to claim 6 wherein said starting adamantane hydrocarbon is 1,3-dimethyladamantane and the product separated is 1-chloro-3,5-dimethyladamantane.

8. Process according to claim 1 wherein said halide is teritary butyl bromide.

9. Process according to claim 8 wherein said acid is sulfuric acid.

10. Process according to claim 9 wherein the strength of the sulfuric acid is 95–99% $H_2SO_4$.

11. Process according to claim 9 wherein the starting adamantane hydrocarbon is selected from the group consisting of methyladamantanes, dimethyladamantanes, ethyladamantanes, methylethyladamantanes, dimethylethyladamantanes and trimethyladamantanes.

12. Process according to claim 11 wherein said temperature is in the range of −10° C. to 5° C. and the strength of the sulfuric acid is 95–99% $H_2SO_4$.

13. Process according to claim 12 wherein said starting adamantane hydrocarbon is 1,3-dimethyladamantane and the product separated is 1-bromo-3,5-dimethyladamantane.

14. Process according to claim 1 wherein said halide is tertiary butyl fluoride and said mineral acid is hydrofluoric acid.

15. Process according to claim 1 wherein the starting adamantane hydrocarbon is selected from the group consisting of methyladamantanes, dimethyladamantanes, ethyladamantanes, methylethyladamantanes, dimethylethyladamantanes and trimethyladamantanes.

16. Process according to claim 15 wherein said tertiary alkyl halide is tertiary butyl chloride or bromide.

17. Process according to claim 16 wherein said acid is sulfuric acid having a strength of 95–99% $H_2SO_4$.

18. Process according to claim 17 wherein said temperature is in the range of −10° C. to 5° C.

References Cited
UNITED STATES PATENTS

| | | | |
|---|---|---|---|
| 2,810,001 | 10/1957 | Wiese | 260—648 |
| 3,485,880 | 12/1969 | Schneider | 260—648 |
| 3,283,001 | 11/1966 | Brown et al. | 260—648 |

DANIEL D. HORWITZ, Primary Examiner